May 23, 1939.  H. B. BRYSON  2,159,421
AUTOMATIC LOAD LOCK
Filed Sept. 27, 1935  2 Sheets-Sheet 1
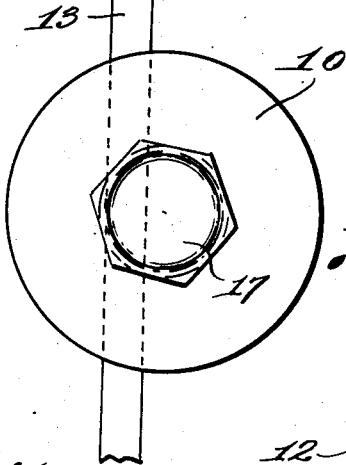
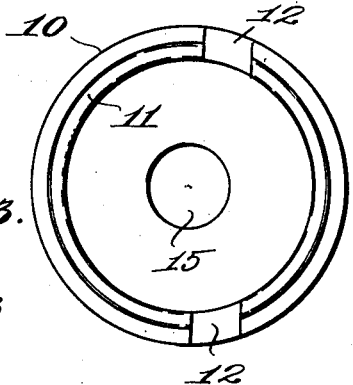
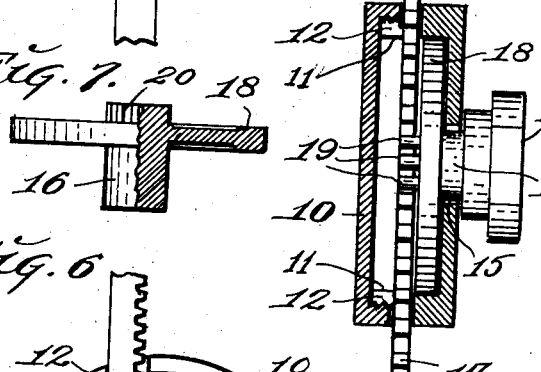
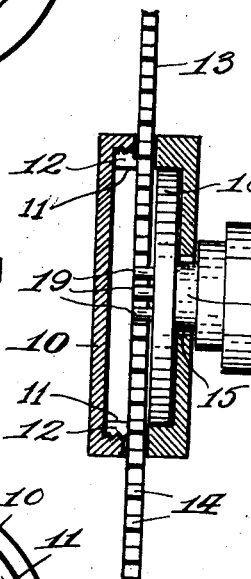
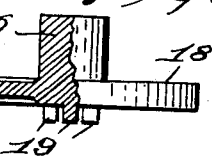
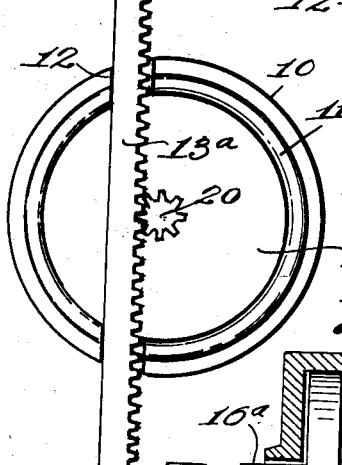
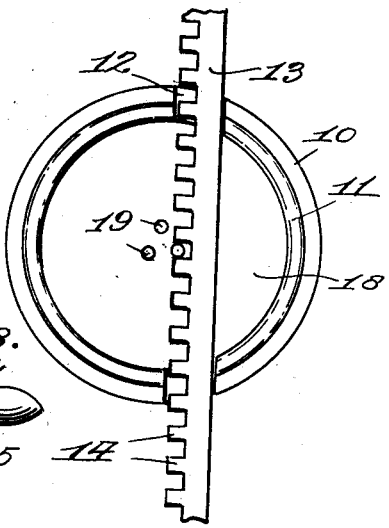
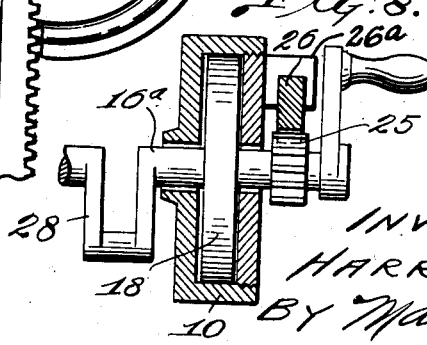
INVENTOR,
HARRY B. BRYSON
BY Martin C. Smith
ATTY.

May 23, 1939. H. B. BRYSON 2,159,421
AUTOMATIC LOAD LOCK
Filed Sept. 27, 1935 2 Sheets-Sheet 2
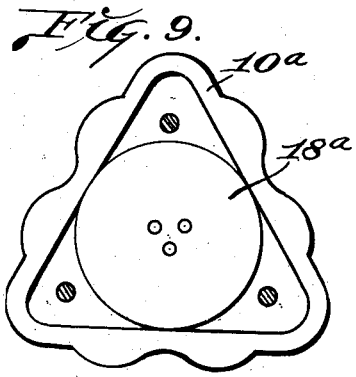
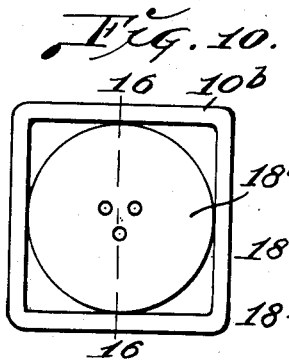
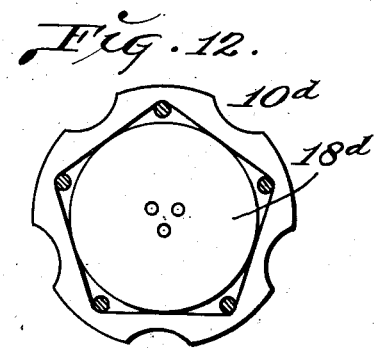
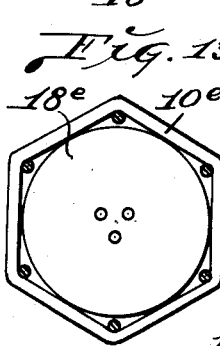
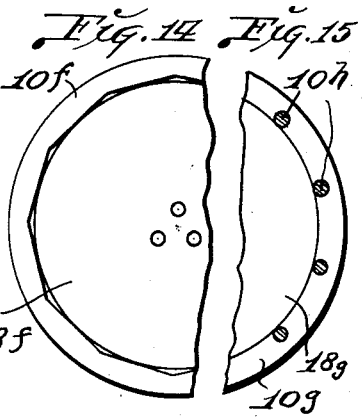
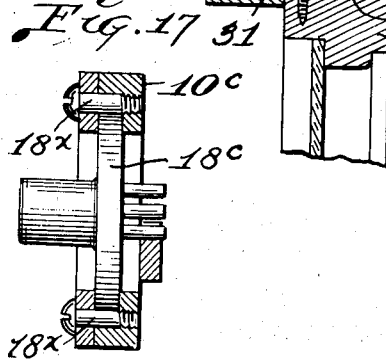
INVENTOR,
HARRY B. BRYSON.
BY Martin P. Smith ATTY.

Patented May 23, 1939

2,159,421

UNITED STATES PATENT OFFICE 2,159,421

AUTOMATIC LOAD LOCK

Harry B. Bryson, Los Angeles, Calif.; Nancy McClung Bryson, administratrix of Harry B. Bryson, deceased, assignor of one-half to Clayton Van Ike, Los Angeles, Calif.

Application September 27, 1935, Serial No. 42,467

10 Claims. (Cl. 192—8)

My invention, which I term an automatic load lock, relates to a device for applying power, either manually or mechanically, to a rotary member that is disposed within a suitable housing, through which passes a rigid member to which the power applied to the rotary member is communicated, thereby causing the rigid member to move forward or backward as desired, through said housing, when the latter and the rotary member are anchored in a stationary position; or, when said rigid member is anchored in a stationary position, the applied power will cause the housing and the rotary member contained therein to travel along said rigid member, so long as the power is applied; and, when such power ceases to be applied, the mechanism becomes static automatically and instantly, and locked.

When the applied power is removed, the weight of the movable member is instantly applied to a point or points of lockage, which is provided by the peripheral contact of the edge of the rotary disc with its housing, as hereinafter more fully described and shown.

In my improved load lock, the power to effect relative movement between the parts is applied rotatively, and when movement ceases, the parts are instantly, peripherally locked.

My invention provides a device that is relatively simple in construction, inexpensive of manufacture, comprising a minimum number of operating parts, and entirely automatic in its lockage function; which is adaptable for a wide variety of uses, for instance, for the convenient and facile raising and lowering of the seats of stationary and revolving chairs and stools; for raising and lowering of the working platform of builders' scaffolds; for the operation of cars on cogged or inclined railways; to the so-caled "monkey", Stillson, and other wrenches; to door, night, and other locks; to the operation of ordinary and casement windows sash; for the operation of automobile window and door panels; to doors af all kinds; for the operation of steeling mechanisms; for the raising and lowering of ear-phones on radio receiver headsets; for the raising and lowering of the head and back parts of hospital and other beds, railway coach, motor bus chairs, physicians' operating chairs and tables, barbers' and beauticians' chairs; and, not only for the operation, but for the instant automatic and positive lockage or anchorage of all such, and many other, mechanisms in any desired, or accidental position.

In the application of power for the driving or operation of machinery, it is the general practice to employ a shaft mounted for rotation in suitable journal boxes or bearings, and said shaft carrying a pulley or belt wheel, a cog wheel, a sprocket wheel or other means of transmitting motion and power, and such arrangement provides a definite and fixed center of rotation for the shaft or journal within its stationary bearing.

My invention, as herein set forth, involves and provides a reversal of the above-mentioned practice, in that it provides means of applying power directly to one side, face or end of a thin cross-section or partial sector, or any desired length of a power shaft, either manually or otherwise, and the transmission of said power to a movable member which may be either straight, curved, rigid or flexible.

The transmission of motion and power in my improved device is accomplished by means of a concentric section of the power shaft or journal as it is rotated in its box or bearing, and which section of the power shaft is relatively small as compared to the entire area of the face of the complete cross-section or partial sector or the end of the length of the shaft used in any given construction.

My improved device utilized the peripheral fixed and definite rotatability of the power shaft or journal, as such within its bearing, plus certain means added to the bearing or housing for the purpose of retaining the rotatable part of the power shaft within said bearing or housing, and the cooperating parts providing means of automatically, instantly and positively locking the mechanism and the load to which power has been applied while operating, when the power ceases to be applied either intentionally or accidentally.

My invention is characterized by a rotary motion-imparting member that is mounted within a continuous bearing or a plurality of spaced bearings with which the periphery of the rotating member or disc is constantly in engagement so that said rotary member has a definite axis of rotation. In other words, the rotary member always rotates on the same axis, as distinguished from a rotary member having a floating or variable axis.

My new principle and method of applying power directly to a power shaft and of transferring or communicating said power to a member that is to be moved, or which is to carry loads, or to accomplish work, and for securely locking the moving and moved parts, when the application of power ceases, is accomplished by means hereinafter more fully described and claimed and illustrated in the accompanying drawings in which:

Fig. 1 is an outside elevational view of a bar shifting and securing device constructed in accordance with my invention.

Fig. 2 is an inside elevational view of that part of the housing having its flange slotted for the reception of the bar or other member, and the side wall of which housing part is perforated at the center for the admission of the shaft of a rotating member.

Fig. 3 is a cross sectional view of the housing and the operating parts lodged therein,—the latter being shown in elevational edge view.

Fig. 4 is an elevational view, partly in section, of the rotary member, and its integral or integrated parts, which is lodged in a housing and which is designed to transmit motion to its cooperating member and for automatically, instantly, and positively locking the mechanism when power ceases to be applied.

Fig. 5 is an inside elevational view showing an entirely new, and never before conceived, designed, or used, method of transmitting motion from one member to another; and for automatically, instantly, and positively locking the mechanism, when power ceases to be applied.

Fig. 6 is an inside elevational view of my invention showing how the conventional rack and pinion may be used as an alternative method of transmitting motion from one member to another; and also for automatically, instantly, and positively locking the mechanism when power ceases to be applied.

Fig. 7 is an elevational view, partly in section, of the rotary member and its integral or integrated parts, when same is designated to be used in connection with the conventional gear-rack.

Fig. 8 is a sectional view similar to Fig. 3 and showing a modified construction wherein the friction disc carrying shaft extends through the housing and showing the motion transmitting means on the outside of the housing.

Figs. 9 to 15 inclusive are elevational views partly in section showing housings of different shaped, each having a plurality of spaced bearings or supports for the rotary disc.

Fig. 16 is a vertical section taken on the line 16—16 of Fig. 10 and showing the periphery of the rotating disc having continuous bearing on the housing within which said disc is positioned.

Fig. 17 is a sectional view similar to Fig. 16 and showing the periphery of the rotary disc on the pins or bolts that retain the parts of the housing in assembled relation.

Fig. 18 is a horizontal section showing my improved load lock utilized for the operation and locking of window-sash.

Fig. 19 is a sectional view taken approximately on the line 19—19 of Fig. 18.

Referring by numerals to the accompanying drawings, which illustrate one embodiment of my invention, 10 designates a housing which may be of any suitable size and shape; and said housing being preferably formed in two parts capable of being readily separated and connected by any suitable mechanical means.

As illustrated in Fig. 2, the housing may include one part having a marginal flange 11, the outer portion of which is externally threaded for the reception of internally threaded flange on the other part.

Formed through flange 11, at points offset from a plane passing through the axis of the housing, are slots 12, through which is adapted to pass the rod 13, or other member, that is to be shifted lengthwise, and positively held after such movement.

In the illustrations, I have shown the exterior surfaces of the housing of my invention as being planar laterally, and circular as to the periphery of these lateral surfaces; but the external surfaces may be of any desired shape or contour. The interior of the housing, I have also shown as planar laterally, and circular as to the short wall or flange 11, in Figs. 2, 3, 5 and 6, rising at right angle to said inner sides of the housing; but these interior side-walls, while preferably planar, may be variable as to surface contour. The flange 11, Figs. 2, 3, 5 and 6, shown circular in form, may be triangular, quadrangular, or multiangular, arising from sidewalls similarly shaped as to their peripheral limits as illustrated in Figs. 9, 10, 12, 13 and 14; or, for such continuous flange, may be substituted a series of bolts, arranged to contact the circular edge of the rotary member, Figs. 4, 5, 6, and 7, said bolts also serving to fix the two parts of the housing together as shown in Figs. 11 and 15.

Lodged or placed within this housing is the circular member or disc 18, with its integral or integrated parts, the shaft 16 and the pins 19; or, the pinion 20, as shown in Figs. 4, 5, 6 and 7. And, also lodged within this housing, and passable forward and backward therethrough, is the specially cogged-bar 13, as shown in Figs. 3 and 5; or, the conventional gear-rack 13a, shown in Fig. 6.

Formed in the center of the side wall of that part of the housing which is slotted in flanges 11, for the member 13, is an aperture 15, and passing therethrough is a shaft 16, of any desired length, on the outer end of which is mounted an operating member, a knob 17, as illustrated in Fig. 3, or, a crank, for the manual application of power. If mechanical power is to be applied to the shaft 16, any suitable means of connecting it to shaft 16 may be applied. The diameter of the aperture 15 is greater than the diameter of the shaft 16, just enough so that there is, or may be, no contact between the aperture 15 and the shaft 16.

Formed integral with, or rigidly secured to shaft 16, is a disc 18, the peripheral edge of which bears just easily rotatably against the inner face of the flange 11 of the housing. Although the face of the rotary disc 18 does frictionally engage the inner face of the side-wall of that part of the housing containing the aperture 15, in practice such frictional engagement will be reduced to a minimum, or as much as desired, by any desired mechanical construction, or means, so as to retard, as little as desired, the free rotation of the disc 18 within its housing when the shaft 16 and its integrated parts, is rotated.

By means of the rotary disc 18, and its integral or integrated parts, and the specially cogged rack 13, as illustrated in Figs. 3, 4 and 5, I am describing my own, new and which I claim to be my own, and never before conceived, designed and used, means of transmitting power from a rotary member to a traveling, or a driven linear or regularly curved member, as follows.

I provide, as integral or integrated parts of the rotary disc 18, within or without the housing, three or more pins 19 extended or projected at right angles, or perpendicular, to that face of the rotary disc 18, which is opposite to the shaft 16, and arranged or fixed radially, concentrically, and equi-angularly around the geometrical center of the disc 18, as illustrated in Fig. 5, which is a face view, and in Fig. 4, which is an edge view of the disc 18, when the said pins are used as the means of transmitting power from the member 18 to the member 13.

If desired the shaft operating means may be arranged on the same side of the disc 18 with the pins 20.

When the rotating member 18 is constructed or provided with the said pins, as illustrated and described, the traveling or driven member 13 will be a straight line, or an arc bar, on one edge of which is a rack of suitably spaced, and preferably perpendicularly faced teeth or cogs, with suitable sized and preferably flat-bottom slots, alternating with the teeth or cogs, so that when the disc 18 is rotated one of the said pins will fall into or engage one of the slots in the member 13, and so on in regular sequences, causing continuous motion of the member 13, forward or backward, as desired, so long as member 13 is rotated.

In practice, the housing 10 is suitably secured to a support in position so that the member 13, to be moved, may pass in either direction through the openings 12, with the cogs 14 of said member in engagement with the pins of member 13; or, member 13 may be made stationary, in which case the housing will travel thereon.

To move member 13 in either direction, the knob 16, or any mechanical equivalent, is secured to shaft 16, and is either manually or mechanically manipulated, so as to rotate shaft 16, and its integral or integrated parts, either forward or backward; and the engagement of the pins of the rotary disc 18 with the cogs 14 of member 13, will impart movement to the latter, and thereby move whatever load it may be desired to move, when member 13 is attached to the load, such as a transom, or the head and back section of a hospital bed.

After the rod or rack-bar, or vice versa, after the housing and its contained mechanism, has been moved to the desired position, it will remain in such position regardless of the amount of pressure that is applied to said rack-bar, or vice versa, to the housing, by reason of the fact that any lengthwise strains or stresses applied to the rack-bar or vice versa to the housing, will be transmitted to the pinion 19 and disc 18, with the result that a portion of the periphery of disc 18 will be pressed against the inner face of flange 11, thus providing an effective pressure brake, which will automatically, instantly, and positively hold said disc against rotation; and, consequently, holding pinion 19 against rotary movement that would otherwise be transmitted to the rod or rack-bar 13.

This sliding movement of the shaft 16, pinion 19, and disc 18, is permitted by reason of the fact that aperture 15, through which shaft 16 passes, is larger in diameter than said shaft.

As an equivalent alternative or substitute for my new rack and pin mechanism, above described, and illustrated in Figs. 3, 4 and 5, I am also illustrating and describing by Figs. 6 and 7, how the conventional gear-rack and pinion may be used as a means of transmitting power from a rotary member to a linear, or arc traveling or driven member; and for the automatic, instant, and positive locking of the mechanism in any desired or accidental position. When the conventional rack and pinion are used as the transmission means in my invention, conventional pinion 20, shown in Figs. 6 and 7, take the place of the pins 19, in Figs. 4 and 5; and the conventional gear-rack 13a, shown in Fig. 6 takes place of the specially cogged rack 13, as shown in Figs. 4 and 5; and when this is done, the entire mechanism of my automatic load lock will function, in every way, identically and as effectively as I have described in connection with my pin and rack mechanism, as shown in Figs. 4 and 5.

Obviously any suitable and practical transmitting or driving engagement between the rotary element and its cooperating or driven member may be provided as substitutes for the pin and rack, or for the rack and pinion elements already described and illustrated.

In Fig. 8 I have illustrated a modified construction wherein shaft 16a that carries friction disc 18, extends through apertures in both side walls of the housing 10, which apertures are slightly larger in diameter than said shaft; and shaft 16a may carry on the outside of the housing, a pinion 25 that engages the teeth of a rack bar 26.

This rack bar 26 may be arranged for sliding movement in suitable guides or bearings 26a that are arranged on the exterior of housing 10.

On the other side of housing 10, shaft 16a may be provided with a crank 27 for the reception of a pitman or the like.

Obviously shaft 16 may be of any desired length and equipped with any one of the power transmitting devices, including the disc 18 and members associated therewith.

To achieve the desired result of locking the movable member of my improved device, the rotary element, either the series of pins 19 or the pinion 20, should be very much smaller in diameter than the disc 18.

In Fig. 9 I have shown a housing 10a substantially triangular in form and with the rotary member 18a having three points of contact or bearing with the inner face of the housing.

In Fig. 10 the housing 10b is shown square in shape and the rotary member 18b has four points of contact or bearing behind the inner face of the wall of said housing.

In Fig. 11 the housing 10c is formed slightly larger than the rotary member 18c and the latter has four points of contact or bearing with the four pins or bolts 18x that hold the parts of the housing in assembled relation.

In Fig. 12 the housing 10d is shown quintangular in form, thereby providing five bearings or points of support for the enclosed rotary member 18d.

In Fig. 13 the housing 10d is shown sixtangular in shape, thus providing six bearings or points of support for the enclosed disc or rotary member 18e.

In Fig. 14 the housing 10f is shown as provided with twelve bearings or points of support for the rotary member 18f, the said bearings being formed on the flange or that portion of the housing that surrounds the periphery of the rotary member.

In Fig. 15 the parts of the housing 10g are held in assembled relation by a plurality of pins or bolts 10h and which latter provide a plurality of bearings or points of support for the rotary member 18g.

In Figs. 18 and 19 I have shown my improved load lock associated with a window for the purpose of raising and lowering the window-sash and locking the same after movement. In this construction the housing 10 that encloses the disc 18 is positioned in the window-jamb and set in flush on the face of the upright member of the window-sash 30 is a rack 31, the teeth of which are engaged by pins 32 that project from the disk 18 near its center.

Suitably secured to disc or rotary member 18 is a beveled pinion 33 that is engaged by a beveled gear wheel 34, the latter being carried by a shaft 35 that is mounted for rotation in the window frame and the outer end of said shaft carrying a crank 36.

When crank 36 is manipulated to rotate shaft 35 beveled gear wheel 35 transmits rotary motion to the disc 18 through beveled pinion 33 and the pinions 32 engage the teeth of rack bar 31 to raise or lower the sash to which said rack bar is connected, and when movement of the sash ceases the same is automatically locked against further movement by the engagement of the periphery of disc 18 with the housing 10.

Obviously, my improved load lock is susceptible of a number of variations, all of which embody the generic principle of automatically and instantly locking the moving member, and in this connection it will be understood that two moving members arranged parallel with each other and mounted to move in opposite directions may be positively locked after movement, but in such construction a rotating element, for instance a pinion or a disc-carrying pin, is utilized for imparting movement to one rack; and driving means, for instance a pinion, is arranged in engagement with the toothed portions of the two racks. Further, minor changes in the construction may be made whereby two or more racks or members mounted for movement and disposed at right angles to each other, or at angles greater or less than right angles may be instantly, automatically and positively locked when motion to the rotary member ceases.

Thus it will be seen that I have provided a device for transmitting power from a rotary member to a traveling or driven member, and for automatically, instantly, and locking the same in any desired or accidental position; and which device is relatively simple in construction, inexpensive of manufacture, and positive in performing the functions for which it is intended.

It will be understood that minor changes in the size, form, and construction of the various parts of my automatic load lock may be made and substituted for those herein shown and described, without departing from the spirit of the invention, the scope of which is set forth in the appended claims.

I claim as my invention:

1. In a device for actuating rods or the like and for holding same in position after movement, a plate provided with an aperture, a shaft passing through said aperture, means carried by said shaft for engaging the member to be actuated, a disc carried by said shaft and having a definite axis of rotation, the periphery of which disc is adapted to constantly contact said plate and by automatic pressure at the end of any movement, to instantly lock the actuated member after it has been moved into any desired or accidental position and means for imparting rotary movement to said shaft.

2. In a device for imparting movement to a member and for securing same after movement, a fixed member provided with contact bearing points, a disc mounted for rotation on a definite axis within said member with its edge in contact and easily rotatable contact with said bearing points, means carried by said disc for engaging the member to be moved and secured after movement.

3. In a device for imparting movement to rods or the like and for automatically locking same after movement, a shaft, a disc carried by said shaft and mounted for rotation on a definite axis, means rigidly associated with said shaft and disc for engaging the member to be moved, and a fixed member contacting said disc, and provided with bearing points with which the edge of the disc automatically contacts, rotatably and statically at the end of any rotary movement to automatically lock said disc and the member that is moved thereby, against movement relative to the fixed member, or vice versa.

4. In a device for imparting movement to rods or the like and for automatically locking same after movement, a shaft, a disc carried by said shaft and mounted for rotation on a definite axis, means rigidly associated with said shaft and disc for engaging the member to be moved, and a fixed member that is adapted to be rotatably and statically contacted by the periphery of said disc and at the end of any rotary movement thereof, to automatically lock said disc and the member that is moved thereby, against movement relative to said fixed member.

5. In a device of the class described, the combination with a movably mounted member, of a shaft, rotary means carried by said shaft and having a definite axis of rotation for engaging and imparting movement to said movably mounted member, a fixed member, and means carried by said shaft for rotatably and automatically contacting said fixed member.

6. The combination with a member mounted for movement, of rotary means having a definite axis of rotation for imparting movement to said member and which rotary means automatically acts at the termination of any degree of rotary movement imparted thereto to resist movement resulting from strains imparted to said movably mounted member and which tend to move the same.

7. The combination with a movably mounted member, of rotative means for imparting movement thereto, said rotative means having a definite axis of rotation and a fixed member with which said rotative movement imparting means is automatically contacted, at the termination of any rotative movement thereof, and when a load is being carried by the movably mounted member tending to move same.

8. In a device of the class described, a disc mounted to rotate on a definite axis, a plurality of pins projecting from the face of said disc adjacent the center thereof, a rack arranged so that its teeth are engaged by said pins as the disc and pins are rotated and a member surrounding said disc, which member is adapted to contact the periphery of the disc so as to lock the rack and disc against relative movement.

9. In a device for imparting movement to a member and for automatically securing said member at the termination of the movement imparted thereto, the combination with a casing, of a shaft extending into said casing, a disc carried by said shaft within said casing and having a definite axis of rotation, means carried by said disc for engaging and imparting movement to the member that is to be moved and means on the casing and adapted to be engaged by a portion of the periphery of said disc at the termination of any degree of rotary movement of said disc for securing said disc and the member moved thereby, against movement relative to said casing.

10. In a device of the class described, the combination with a movably mounted member, of a shaft and disk, means carried by said disk and having a definite axis of rotation for engaging and imparting movement to said movably mounted member, a fixed member adjacent the periphery of said disk and adapted to be engaged by said disk with pressure for locking said shaft, and parts carried thereby against movement relative to said fixed member at the termination of any rotary movement of said disk and shaft.

HARRY B. BRYSON.